United States Patent
Huang et al.

(10) Patent No.: US 6,900,714 B1
(45) Date of Patent: May 31, 2005

(54) SYSTEM AND METHOD FOR QUENCH AND OVER-CURRENT PROTECTION OF SUPERCONDUCTOR

(75) Inventors: Xianrui Huang, Clifton Park, NY (US); Evangelos Trifon Laskaris, Schenectady, NY (US); Kiruba Haran Sivasubramaniam, Clifton Park, NY (US); James William Bray, Niskayuna, NY (US); David Thomas Ryan, Niskayuna, NY (US); James Michael Fogarty, Schenectady, NY (US); Albert Eugene Steinbach, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/882,024

(22) Filed: Jun. 30, 2004

(51) Int. Cl.[7] .............................. H01F 6/00; H02H 7/00; H02H 9/00
(52) U.S. Cl. ........................ 335/216; 310/52; 310/53; 310/54; 62/47.1; 62/51.1; 505/850; 505/879; 505/885; 505/892; 505/893; 361/19
(58) Field of Search ......................... 335/216, 296–301; 324/309–320; 62/47.1–51.1; 505/850, 879, 885, 888–899; 310/52–54; 361/19

(56) References Cited

U.S. PATENT DOCUMENTS

| 5,060,481 A | * | 10/1991 | Bartlett et al. ............... 62/51.2 |
| 5,150,578 A | * | 9/1992 | Oota et al. .................... 62/47.1 |
| 5,410,286 A | | 4/1995 | Herd et al. .................. 335/216 |
| 5,857,342 A | * | 1/1999 | Rohlfing et al. ............. 62/51.1 |
| 5,862,028 A | | 1/1999 | Kalsi ............................ 361/19 |
| 6,420,842 B1 | | 7/2002 | Gold .......................... 318/141 |
| 2002/0053889 A1 | | 5/2002 | Gold .......................... 318/154 |

* cited by examiner

Primary Examiner—Ramon M. Barrera
(74) Attorney, Agent, or Firm—Fletcher Yoder

(57) ABSTRACT

A system and method for protecting a superconductor. The system may comprise a current sensor operable to detect a current flowing through the superconductor. The system may comprise a coolant temperature sensor operable to detect the temperature of a cryogenic coolant used to cool the superconductor to a superconductive state. The control circuit is operable to estimate the superconductor temperature based on the current flow and the coolant temperature. The system may also be operable to compare the estimated superconductor temperature to at least one threshold temperature and to initiate a corrective action when the superconductor temperature exceeds the at least one threshold temperature.

38 Claims, 3 Drawing Sheets

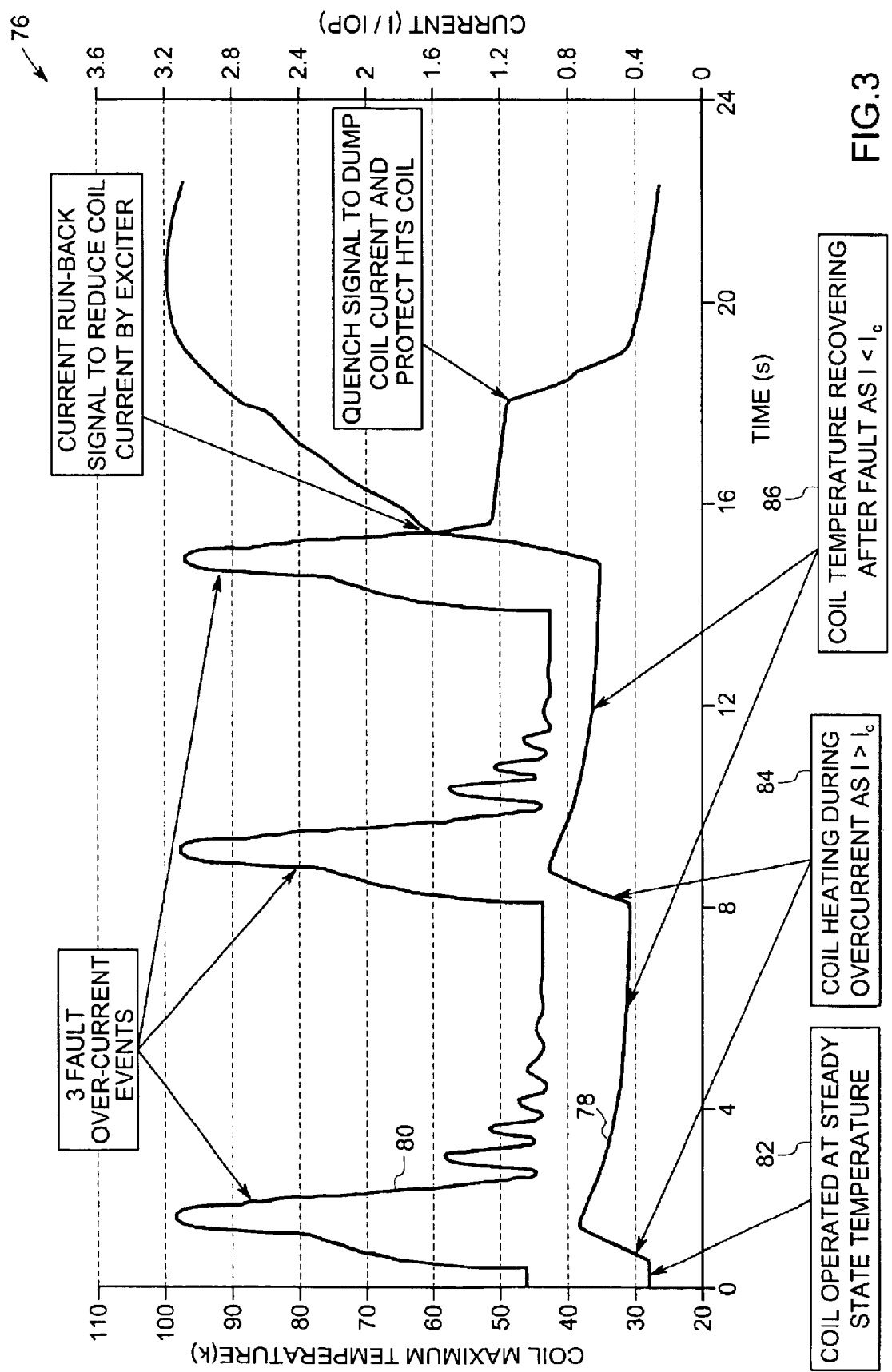

SYSTEM AND METHOD FOR QUENCH AND OVER-CURRENT PROTECTION OF SUPERCONDUCTOR

STATEMENT REGARDING FEDERALLY SPONSORED RESEARCH & DEVELOPMENT

This invention was made with Government support under contract number DE-FC36-02GO11100 awarded by U.S. Dept. of Energy. The Government has certain rights in the invention.

BACKGROUND

The invention relates generally to superconductors, and in particular to system and method for quench and over-current protection of a superconductive coil of an electric machine.

A superconductor is a material that will conduct electricity with no electrical resistance. Superconductivity occurs in certain materials when the material is cooled below a critical temperature. In conventional commercial power generation and transmission systems, such as generators, motors, and transformers, the amount of electrical current that flows through the systems may be significant. Because these conventional systems have electrical resistance, a significant amount of power that flows through the system is consumed as resistive heating. The power lost to resistive heating reduces the efficiency of the power generation system. Consequently, superconductors have been introduced for use in commercial power generation and transmission systems. For example, superconductive rotor coils have been developed for use in the rotors of electric machines. Electricity flowing through the superconductive rotor coil is used to produce a magnetic field. Because the superconductive rotor coil has no electrical resistance, the superconductive rotor coil is able to produce the magnetic field with no loss of power due to resistive heating.

However, there is a limit on the current a superconductor can carry and remain superconducting, known as the critical current. The critical current is a strong function of the temperature of the superconductor and the magnetic field. As the current flowing through the superconductor and the temperature changes during operation of the superconductor, the critical current also changes over time. If the current flowing through the superconductor exceeds the lowest critical current of the coil, a portion of the superconductor loses its superconductivity and enters a normal resistive state. The portion of the coil that is in the normal resistive state will cause resistive heating to occur in the superconductor. If the resistive heating of the superconductor is allowed to continue, the superconductor may enter a state of irreversible thermal runaway, known as a quench.

The quench condition may lead to damage of the superconductor. For example, in a superconductive rotor coil, a sufficient temperature gradient may be generated in the coil that will cause differential expansion to occur. The differential expansion may, in turn, lead to strain related damage in the coil. Therefore, it is desirable to determine the critical current of the superconductor during operation and to remove or reduce the current flowing through the superconductor during an over-current or a quench condition.

Quenching in the superconductive coil may be detected by measuring a voltage developed across the coil. However, this method of detecting quenching is problematic in electric machines that generate electrical noise because the noise causes large inductive voltages to be generated across the coil during normal operation, thus making it difficult to determine when quenching is actually occurring in the coil.

Similarly, temperature sensors may be used to monitor the coil temperatures. The magnetic energy is dumped from the coil when the detected coil temperature exceeds a predetermined limit. But it is difficult to locate the temperature sensors at the hot spot during a quench. Therefore this technique requires multiple temperature sensors to be placed at many locations to be effective.

Accordingly, a technique that enables an over-current condition or a quench condition to be detected in a superconductor is desirable. In addition, a technique that enables the superconductor to be protected from damage caused by an over-current or a quench condition is also desirable.

BRIEF DESCRIPTION

In accordance with one aspect of the present invention, a superconductive device is provided. The superconductive device comprises a superconductor operable to be cooled by a cryogenic coolant. The superconductive device also comprises a superconductor protection system. The superconductor protection system may further comprise a cryogenic coolant temperature sensor and a superconductor current sensor coupled to a processor-based device. The processor-based device is operable to estimate superconductor temperature based on cryogenic coolant temperature and current flow through superconductor.

In accordance with another aspect of the present invention, a rotating electric machine is provided. The rotating electric machine comprises a rotor and a superconductor protection system. The rotor comprises a superconductive rotor coil electrically coupled to an exciter and cooled by a cryogenic coolant. The superconductor protection system comprises a current sensor operable to provide a signal representative of current flow through the superconductive rotor coil. The system also comprises a temperature sensor operable to provide a signal representative of cryogenic coolant temperature. The system may, in addition, comprise a processor-based device that is coupled to the current sensor and the temperature sensor to enable the device to receive the signal representative of current flow through the superconductive rotor coil and the signal representative of cryogenic coolant temperature. The device is operable to estimate the superconductive rotor coil temperature based on the signal representative of cryogenic coolant temperature and the signal representative of current flow through the superconductive rotor coil.

In accordance with another aspect of the present invention, a protection system for a superconductor is provided. The processor-based device is a control circuit operable to initiate a corrective action to at least one of reducing and stopping the current flow to the superconductor when the estimated superconductor temperature exceeds a first defined temperature.

In accordance with another aspect of the present invention, a method of protecting a superconductor from a quench condition is provided. The method comprises cooling a superconductor via a cryogenic coolant and detecting cryogenic coolant temperature. The method also comprises estimating superconductor temperature based on the current flow through the superconductor and the cryogenic coolant temperature. The method may also further comprise comparing an estimated superconductor temperature to a threshold temperature and initiating a corrective action to protect the superconductor when the estimated superconductor temperature exceeds the threshold temperature.

In accordance with another aspect of the present invention, a method of detecting a quench condition in a superconductor is provided. The method comprises operating a processor-based device to estimate superconductor temperature based on a thermal model that utilizes the current flow through the superconductor and the cryogenic coolant temperature to estimate the superconductor temperature.

In accordance with another aspect of the present invention, a computer program for enabling a processor-based device to estimate superconductor temperature based on the current flow through the superconductor and the cryogenic coolant temperature is provided.

DRAWINGS

These and other features, aspects, and advantages of the present invention will become better understood when the following detailed description is read with reference to the accompanying drawings in which like characters represent like parts throughout the drawings, wherein:

FIG. 3 is a graph illustrating variation of maximum coil temperature and current flowing through a superconductive coil versus time in accordance with an exemplary embodiment of the present invention.

DETAILED DESCRIPTION

Figure 1:
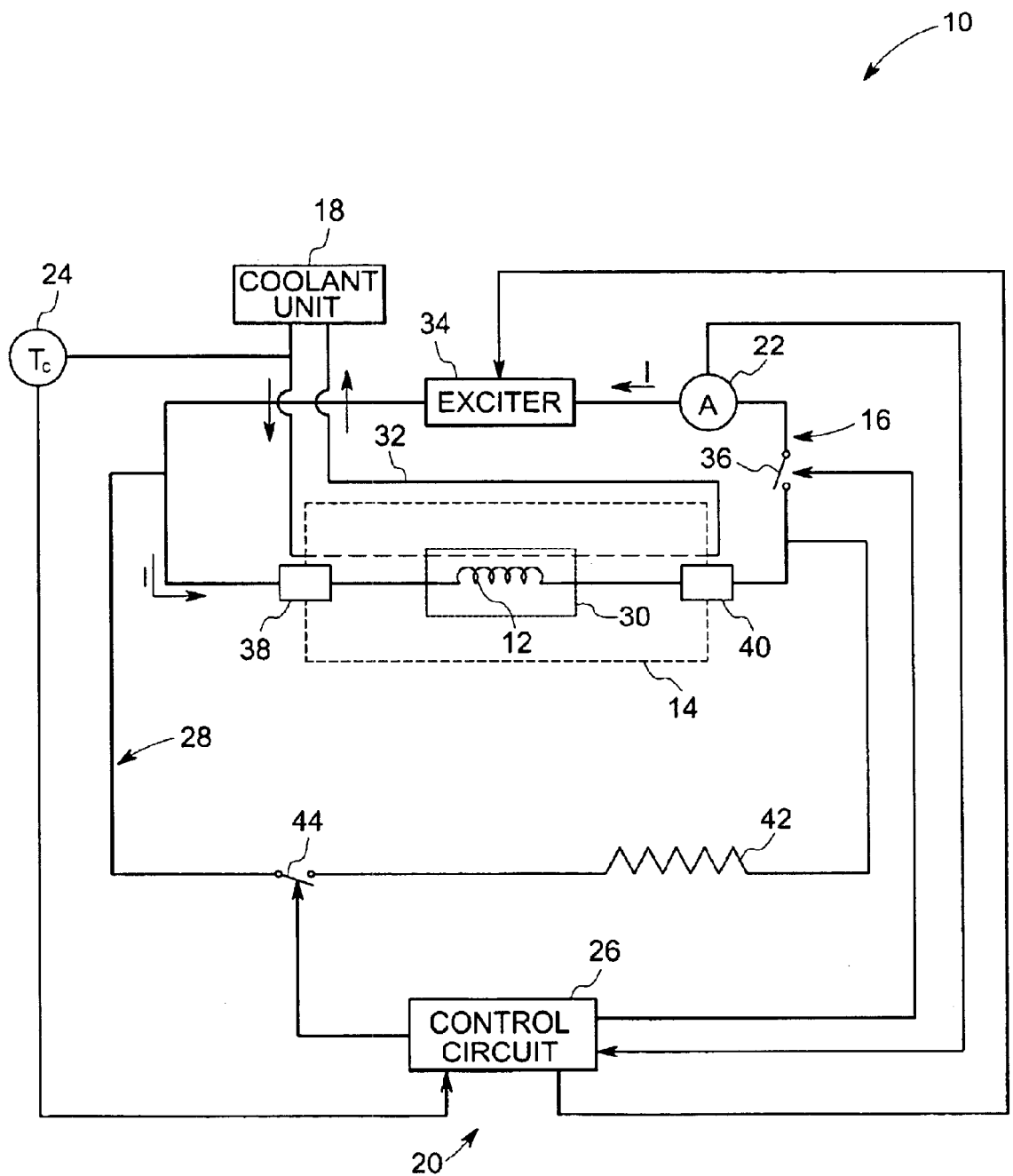
FIG. 1 is a schematic view of a electric machine having a superconductive rotor coil and a quench and over-current protection system for protecting the superconductive rotor coil from damage due to quenching in the superconductive rotor coil, in accordance with an exemplary embodiment of the present invention.

Referring now to FIG. 1, an electric machine is illustrated, and represented generally by reference numeral 10. The electric machine 10 includes a power generation or transmission device that utilizes HTS superconductors, such as a generator. However, the present techniques are applicable for use in other devices utilizing superconductors, such as motors, medical imaging systems, and the like. In the illustrated embodiment, the electric machine 10 has a high temperature superconductive coil 12 that is disposed on a rotor 14. The superconductive coil 12 generates a magnetic field from an electric current received from an exciter circuit 16. A coolant unit 18 is provided for supplying cryogenic coolant, such as helium, for cooling the superconductive coil 12 to a cryogenic temperature to achieve a superconductive state. For example the superconductive rotor coil 12 may be cooled to a temperature of 20 to 30 K to achieve the superconductive state. When the electrical current flowing through the superconductive coil 12 exceeds a critical current, a portion of the superconductive coil 12 loses its superconductivity and a quench condition within the superconductive coil may occur.

A quench and over-current protection system 20 is provided to protect the superconductive coil 12 from damage due to a quench or over-current fault condition. The quench and over-current protection system 20 is operable to detect an increase in the resistance of the superconductive coil 12 as a result of resistive heating before a quench condition exists in the coil 12. The conventional technique is not suitable for protection of a high temperature superconductive machine because the heat generation and the thermal condition of the HTS coil during a quench is complex and highly nonlinear. However the present system is operable to provide on-line results of complex and non-linear thermal or quench condition.

In the illustrated embodiment, the quench and over-current protection system 20 comprises a current sensor 22, a coolant temperature sensor 24, a control circuit 26, and a dump circuit 28. Some of the disadvantages of prior techniques used to protect superconductive rotor coils from a quench condition are that it is difficult to monitor the voltage or the temperature of the superconductive coil 12. There are a number of reasons for this. For example, in electrical machines operated in a noisy environment, large inductive voltages are generated across the coil during normal operation, thus making it difficult to distinguish the small resistive voltage due to a quench from the induced voltages. If, on the other hand, the temperature is monitored instead of the voltage, then it is difficult to locate the temperature sensors at the hot spot during a quench. This technique requires temperature sensors to be placed at many locations on the superconductive rotor coil to be effective. Additionally, in previous rotating machines, such as motors and generators, the voltage or temperature signals have to be transmitted from the rotating coil to a stationary control circuit using either multiple slip rings or a telemetry system.

The control circuit 26 is a processor-based device that comprises a processor and memory operable to store programming instructions to direct the operation of the processor. The control circuit 26 is operable to continuously monitor coil current and cooling conditions of the superconductive coil 12 and use this information to protect the coil 12 from an over-current and/or a quench condition. The programming instructions stored in memory enable the processor to use the coil current data and cooling condition data to build a thermal model of the superconductor. The current and cooling conditions of the coil are used with predetermined coil material properties, the superconductor critical current as a function of temperature and magnetic field, the heat capacity, electric resistivity, coil thermal conductivity, electric resistivity, etc., to build the model to predict the operating conditions in the HTS coil 12. The model may also update the coil material properties based on a number of thermal and mechanical operation cycles and also coil wire degradation data. This enables the present system to protect the coil from damage due to quenching under transient operating conditions by monitoring easily accessible operating parameters of the coil.

The current sensor 22 is operable to transmit a signal representative of the current flowing through the superconductive coil 12 to the control circuit 26. The control circuit will typically include hardware circuitry and software for performing computations indicative of over-current and quench condition as described below. As appreciated by those skilled in the art, the control circuit may include a range of circuitry types, such as a microprocessor module, a computer, a programmable logic controller, and the like. The control circuit 26 is operable to calculate a peak perpendicular magnetic field based on the signal representative of the current flowing through the superconductive coil 12. The temperature coolant sensor 24 is operable to transmit a signal representative of the coolant temperature to the control circuit 26. The control circuit 26 is operable to estimate a maximum superconductive coil temperature based on the signal representative of the coolant temperature.

The control circuit 26 is further operable to estimate the critical current in the superconductive coil 12 based on the peak perpendicular magnetic field and the maximum superconductive coil temperature. In this embodiment, the control circuit 26 determines that an over-current fault or a quench condition exists when the maximum superconductive coil temperature exceeds at least one predetermined threshold temperature. The predetermined threshold temperatures are set based on the coil material properties and the machine configuration. If an over-current fault exists, the control circuit 26 may activate the exciter circuit 16 to reduce power to the coil 12. If the quench condition is detected, the control circuit 26 may additionally activate the dump circuit 28 to discharge the magnetic energy stored in the coil 12.

In the illustrated embodiment, an electromagnetic induction shield 30 is provided around the superconductive coil 12. A coolant flow path 32 is routed through the electromagnetic induction shield 30 to enable coolant to flow from the cooling unit 18 to the superconductive coil 12. As mentioned above the superconductive coil 12 receives electric current from the exciter circuit 16. In a rotating machine such as generators and motors, the exciter circuit 16 comprises an exciter 34, a switch 36, and slip rings 38, 40. An electric current generated in the exciter 34 is coupled to the rotor 14 via the slip rings 38, 40. The switch 36 of the exciter circuit 16 is controlled by the control circuit 26 and may be opened to remove power to the superconductive rotor coil 12.

The dump circuit 28 comprises a dump resistor 42 and a switch 44. The switch 44 is controlled by the control circuit 26 and may be closed by the control circuit when a quench condition of the coil 12 is detected. This enables the superconductive coil 12 to discharge the magnetic energy stored in the coil 12 through the dump resistor 42 to prevent further resistive heating of the coil 12 when the quench condition of the coil is detected.

Figure 2:
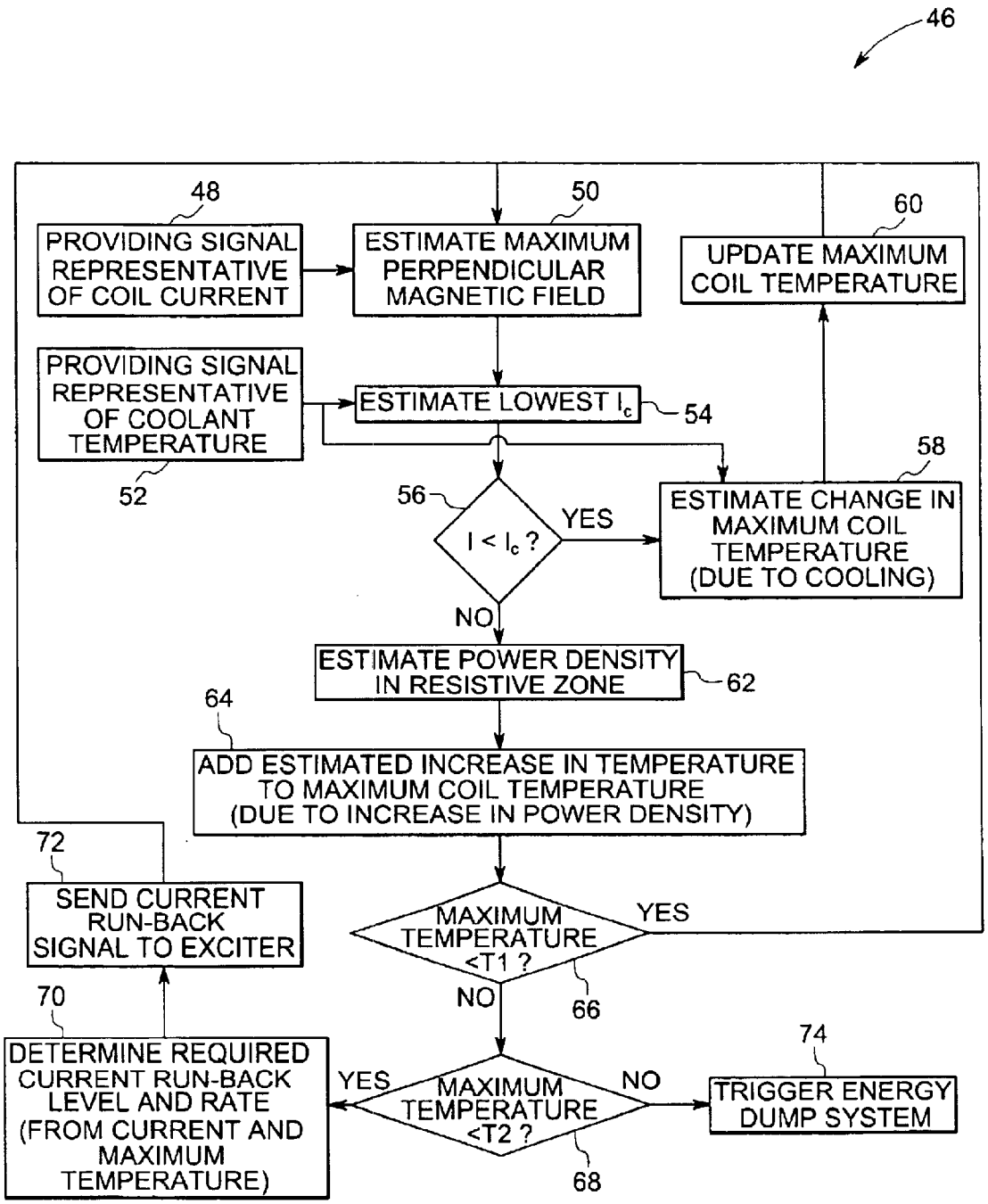
FIG. 2 is a flow chart illustrating a method of quench protection of the superconductive rotor coil of FIG. 1.

Referring generally to FIG. 2, a method of utilizing the quench and over-current condition protection system 20 to protect the superconductive rotor coil 12 from quenching and/or an over-current fault condition is illustrated, and represented generally by reference numeral 46. The method 46 comprises providing a signal representative of current flowing through the superconductive coil 12, as represented by block 48. The method 46 also comprises calculating the peak perpendicular magnetic field generated by the superconductive coil 12 based on the signal representative of the current flowing through the coil 12, as represented by block 50. The method further comprises providing a signal representative of coolant temperature, as represented by block 52. The method also comprises estimating the lowest critical current (Ic) in the coil 12 based on the peak perpendicular magnetic field and the maximum superconductive coil temperature, as represented by block 54. The maximum superconductive coil temperature is estimated based on the signal representative of the coolant temperature.

The method also comprises comparing the current flowing through the coil with the estimated critical current, as represented by block 56. If the current flowing through the coil is less than the critical current (i.e., I<Ic), a change in the maximum coil temperature due to cooling is estimated via the control circuit 26, as represented by block 58. The method further comprises updating the maximum superconductive coil temperature as represented by block 60. If the current flowing through the coil is greater than the critical current (i.e., I>Ic), power density in a resistive zone of the coil is estimated via the control circuit 26, as represented by block 62. The method further comprises updating the maximum superconductive coil temperature by adding an increase in temperature of the coil due to the increase in power density to the previously updated maximum coil temperature, as represented by block 64.

The method also comprises comparing the updated maximum coil temperature to a first predetermined threshold (T1) temperature, as represented by block 66. The first threshold temperature is defined as a temperature above which the critical current is less than the current flowing the coil. For example, the first predetermined threshold temperature may be set to 60 K. The method 46 is repeated if the updated maximum coil temperature is less than the first threshold temperature. If the updated maximum coil temperature is greater than the first threshold temperature, the updated maximum coil temperature is then compared to a second threshold temperature, as represented by block 68. The second predetermined threshold temperature is defined as a temperature above which quench of the coil occurs. For example the second predetermined threshold temperature may be set to 88 K. The second predetermined threshold temperature is computed based on the following relation:

$$T_2 = T_{max} - \Delta T \quad (1)$$

Where:

$T_2$ is the second predetermined threshold temperature,
$T_{max}$ is the updated maximum coil temperature, and
$\Delta T$ is the temperature rise during current dump.

If the updated maximum coil temperature is less than the second predetermined threshold temperature, the control circuit 26 reduces current from the exciter to the superconductive coil. First the control circuit determines the desired amount by which the coil current should be reduced and the desired rate at which to reduce the coil current, as represented by block 70. The determination is done based on the coil current and the maximum coil temperature. Next, the system sends a signal to the exciter to reduce the coil current at the desired rate and by the desired amount, as represented by block 72. This reduction in the coil current protects the coil 12 from an over-current fault condition. If the updated maximum coil temperature is greater than the second predetermined threshold temperature, the control circuit 26 opens the switch 36 of the exciter circuit 16 and activates the dump circuit 28, as represented by block 74. This enables to remove the current flow through the coil 12 and also to discharge the magnetic energy stored in the coil 12. The resistive heating of the coil 12 is removed. Thus the superconductive coil 12 is protected from the harmful effects of quenching.

Referring now generally to FIG. 3, variations in coil temperature and current flow through the coil over time are illustrated, and represented generally by reference numeral 76. The estimated temperature is represented generally by reference numeral 78 and the coil current is represented generally by reference numeral 80. Generally, there are three heating states of the coil based on the relationship of the coil current to the critical current and the amount of cooling provided by the cooling system. The first heating state occurs when the coil current and the critical current are such that the cooling system is able to maintain the coil temperature generally constant or steady state, as represented by reference numeral 82. The second heating state, represented by reference numeral 84, occurs when the coil current is greater than the critical current, causing resistive heating to occur, and the cooling system is not able to overcome the resistive heating. Thus, coil temperature begins to increase. The third heating state, represented by reference numeral 86, occurs when the coil current falls back below the critical current and resistive heating stops. The cooling system is then able to reduce coil temperature.

The computer model estimates the coil peak temperature and the critical current based on the temperature and the current magnetic field. The computer model then uses a thermal model that enables it to estimate the coil temperature. During steady-state operation, the model verifies that the coil 12 temperature is constant. During an over-current condition, the model performs a fast thermal calculation to estimate the coil temperature. When the over-current condition occurs, the model calculates the peak perpendicular magnetic field of the coil, the maximum coil temperature, the critical current, and the amount of resistive heating. After the over-current condition is over, the model continues the thermal calculation during the cooling period after the coil current has fallen below the critical current until the coil attains a steady state operating temperature.

As illustrated in the FIG. 3, when the temperature of the coil exceeds a first threshold temperature, the exciter is controlled to reduce the current flowing through the coil. If the temperature of the coil exceeds a second threshold temperature, the exciter circuit is opened and the dump circuit is activated, resulting in removal of power from the coil and discharge of magnetic energy stored in the coil through the dump resistor. The temperature of the coil is thereby reduced from the elevated temperature to the steady state operating temperature.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A superconductive device comprising:
    a superconductor operable to be cooled by a cryogenic coolant; and
    a superconductor protection system comprising a cryogenic coolant temperature sensor and a superconductor current sensor coupled to a processor-based device, wherein the processor-based device is operable to estimate superconductor temperature based on cryogenic coolant temperature and current flow through the superconductor.

2. The superconductive device of claim 1, wherein the processor-based device is configured to estimate the field strength of a magnetic field generated by the superconductor based on the current flow through the superconductor.

3. The superconductive device of claim 2, wherein the processor-based device is configured to estimate the critical current of the superconductor based on the field strength of the magnetic field generated by the superconductor and the estimated superconductor temperature.

4. The superconductive device of claim 3, wherein the processor-based device is further configured to estimate a change in superconductor temperature based on the difference between the current flow through the superconductor and the critical current.

5. The superconductive device of claim 4, wherein the processor-based device is configured to update the estimated superconductor temperature based on the estimated superconductor temperature and the change in superconductor temperature.

6. The superconductive device of claim 1, wherein the processor-based device is operable to initiate a corrective action when the estimated superconductor temperature exceeds a defined temperature, wherein the corrective action comprises directing an exciter to reduce current flowing through the superconductor when the estimated superconductor temperature exceeds a first defined temperature.

7. The superconductor device of claim 6, wherein the processor-based device is operable to activate a switch to prevent the exciter from supplying current to the superconductor when the estimated superconductor temperature exceeds a second defined temperature.

8. The superconductor device of claim 6, wherein the processor-based device is operable to activate a dump circuit to discharge the magnetic energy stored in the superconductor when the estimated superconductor temperature exceeds the second defined temperature.

9. The superconductor device of claim 6, wherein the corrective action comprises activating a switch to prevent the exciter from supplying current to the superconductor when the updated maximum superconductor temperature exceeds the defined temperature.

10. A rotating electrical machine, comprising:
    a rotor comprising a superconductive rotor coil electrically coupled to an exciter and cooled by a cryogenic coolant; and
    a superconductor protection system comprising:
        a current sensor operable to provide a signal representative of current flow through the superconductive rotor coil;
        a temperature sensor operable to provide a signal representative of cryogenic coolant temperature; and
        a processor-based device coupled to the current sensor and the temperature sensor, wherein the processor-based device is operable to estimate superconductive rotor coil temperature based on the signal representative of cryogenic coolant temperature and the signal representative of current flow through the superconductive rotor coil.

11. The rotating electric machine of claim 10, wherein the processor-based device is configured to estimate the field strength of a magnetic field generated by the superconductive rotor coil based on the current flow through the superconductive rotor coil.

12. The rotating electric machine of claim 11, wherein the processor-based device is configured to estimate the critical current of the superconductive rotor coil based on the field strength of the magnetic field generated by the superconductive rotor coil and the estimated superconductive rotor coil temperature.

13. The rotating electric machine of claim 12, wherein the processor-based device is further configured to estimate a change in superconductive rotor coil temperature based on the difference between the current flow through the superconductive rotor coil and the critical current.

14. The rotating electric machine of claim 13, wherein the processor-based device is configured to update the estimated superconductive rotor coil temperature based on the estimated superconductive rotor coil temperature and the change in superconductive rotor coil temperature.

15. The rotating electric machine of claim 10, wherein the processor-based device is operable to initiate a corrective action when the extimated superconductive rotor coil temperature exceeds a defined temperature, wherein the corrective action comprises directing an exciter to reduce current flowing through the superconductive rotor coil when the estimated superconductive rotor coil temperature exceeds a first defined temperature.

16. The rotating electric machine of claim 15, wherein the processor-based device is operable to activate a switch to prevent the exciter from supplying current to the superconductor when the estimated superconductor temperature exceeds a second defined temperature.

17. The rotating electric machine of claim 15, wherein the processor-based device is operable to activate a dump circuit to discharge the magnetic energy stored in the superconductor when the estimated superconductor temperature exceeds the second defined temperature.

18. A protection system for a superconductor, the system comprising:
   a current sensor configured to provide a signal representative of current flowing through the superconductor;
   a temperature sensor configured to provide a signal representative of a cryogenic coolant temperature used to cool the superconductor; and
   a control circuit configured to establish an estimated superconductor temperature based on the signal representative of current flowing through the superconductor and the signal representative of a cryogenic coolant temperature used to cool the superconductor, wherein the control circuit is operable to initiate a corrective action to at least one of reducing and stopping the current flowing to the superconductor when the estimated superconductor temperature exceeds a first defined temperature.

19. The system of claim 18, wherein the control circuit is configured to establish the estimated superconductor temperature based on the signal representative of the cryogenic coolant temperature.

20. The system of claim 18, wherein the control circuit is configured to establish an estimated magnetic field strength of the magnetic field generated by the supercondutor based on the signal representative of the current flowing through the superconductor.

21. The system of claim 20, wherein the control circuit is configured to establish an estimated critical current in the superconductor based on the estimated magnetic field strength of the magnetic field generated by the superconductor and the estimated superconductor temperature.

22. The system of claim 18, wherein the control circuit directs a current source to reduce the current flowing from current source to the superconductor when the estimated superconductor temperature exceeds the first defined temperature.

23. The system of claim 22, wherein the control circuit directs the current source to stop supplying current to the superconductor when the estimated superconductor temperature exceeds a second defined temperature.

24. The system of claim 23, wherein the control circuit activates a dump circuit to discharge the magnetic energy from the superconductor when the estimated superconductor temperature exceeds the second defined temperature.

25. A method of protecting a superconductor from a quench condition, the method comprising:
   cooling a superconductor via a cryogenic coolant;
   detecting cryogenic coolant temperature;
   detecting current flow through the superconductor;
   estimating superconductor temperature based on the current flow through the superconductor and the cryogenic coolant temperature; and
   comparing an estimated superconductor temperature to a threshold temperature and initiating a corrective action to protect the superconductor when the estimated superconductor temperature exceeds the threshold temperature.

26. The method of claim 25, wherein estimating superconductor temperature comprises estimating magnetic field strength of the magnetic field generated by the superconductor based on the current flowing through the superconductor.

27. The method of claim 26, wherein estimating superconductor temperature comprises estimating the critical current of the superconductor based on the magnetic field strength of the magnetic field generated by the superconductor based on the current flowing through the superconductor, and the estimated superconductor temperature.

28. The method of claim 27, wherein estimating superconductor temperature comprises estimating a change in the superconductor temperature due to a difference between the current flowing through the superconductor and the estimated critical current.

29. The method of claim 25, wherein the corrective action comprises controlling an exciter to reduce current flowing through the superconductor when the estimated superconductor temperature exceeds a first threshold temperature.

30. The method of claim 25, wherein the corrective action comprises activating a dump circuit to discharge the magnetic energy from the superconductor when the estimated superconductor temperature exceeds the second threshold temperature.

31. A method of detecting a quench condition in a superconductor, comprising:
   detecting coolant temperature of a cryogenic coolant used to cool the superconductor;
   detecting current flow through the superconductor; and
   operating a processor-based device to estimate superconductor temperature based on a thermal model that utilizes the current flow through the superconductor and the cryogenic coolant temperature to estimate the superconductor temperature.

32. The method of claim 31, wherein estimating superconductor temperature comprises estimating magnetic field strength of the magnetic field generated by the superconductor based on the current flowing through the superconductor.

33. The method of claim 32, wherein estimating superconductor temperature comprises estimating the critical current of the superconductor based on the magnetic field strength of the magnetic field generated by the superconductor based on the current flowing through the superconductor, and the estimated superconductor temperature.

34. The method of claim 33, wherein estimating superconductor temperature comprises estimating a change in the superconductor temperature due to a difference between the current flowing through the superconductor and the estimated critical current.

35. A computer program, comprising:
   a first routine stored in a tangible medium to enable a processor-based device to estimate superconductor temperature based on current flow through the superconductor and superconductor coolant temperature;
   a second routine stored in a tangible medium to enable the processor-based device to estimate superconductor critical current based on the estimated superconductor temperature; and
   a third routine stored in a tangible medium to enable the processor-based device to estimate a change in superconductor temperature based on a difference between the current flowing through the superconductor and the estimated critical current for the superconductor.

36. The computer program of claim 35, wherein the second routine enables the processor-based device to establish magnetic field strength of a magnetic field generated by the superconductor based on the current flowing through the superconductor.

37. The computer program of claim 36, wherein the second routine enables the processor-based device to estimate superconductor critical current based on the magnetic field strength.

38. The computer program of claim 35, wherein the third routine comprises a thermal model of the superconductor to enable the processor-based device to estimate an increase in superconductor temperature due to resistive heating caused by the current flowing through the superconductor exceeding the superconductor critical current.

* * * * *